(12) United States Patent
Luo et al.

(10) Patent No.: US 8,470,160 B2
(45) Date of Patent: Jun. 25, 2013

(54) METHODS, SYSTEMS AND APPARATUS RELATING TO ELECTROCHEMICAL MACHINING

(75) Inventors: Yuefeng Luo, Mechanicville, NY (US); William E. Adis, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/567,835

(22) Filed: Sep. 28, 2009

(65) Prior Publication Data

US 2011/0073485 A1   Mar. 31, 2011

(51) Int. Cl.
*B23H 3/00* (2006.01)

(52) U.S. Cl.
USPC .............................. 205/651; 205/649; 205/654

(58) Field of Classification Search
USPC .......................................... 205/649, 651, 654
See application file for complete search history.

(56) References Cited

U.S. PATENT DOCUMENTS

| | | | | |
|---|---|---|---|---|
| 4,213,834 | A * | 7/1980 | Semashko et al. | 205/642 |
| 4,851,090 | A * | 7/1989 | Burns et al. | 205/670 |
| 6,835,299 | B1 * | 12/2004 | Tchugunov | 205/654 |
| 8,057,645 | B2 * | 11/2011 | McGee et al. | 204/223 |
| 2006/0243601 | A1 * | 11/2006 | Bayer et al. | 205/654 |
| 2009/0008265 | A1 * | 1/2009 | Bayer et al. | 205/654 |
| 2009/0016810 | A1 * | 1/2009 | Geiger et al. | 403/119 |

FOREIGN PATENT DOCUMENTS

| | | |
|---|---|---|
| GB | 1509241 A | 5/1978 |
| JP | 58077411 A | 5/1983 |
| JP | 60108233 A | 6/1985 |
| JP | 62015014 A | 1/1987 |

OTHER PUBLICATIONS

Search Report and Written Opinion from EP Application No. 10179548.2 dated Aug. 13, 2012.

* cited by examiner

*Primary Examiner* — Nicholas A Smith
(74) *Attorney, Agent, or Firm* — Mark E. Henderson; Ernest G. Cusick; Frank A. Landgraff

(57) ABSTRACT

A method of electrochemical machining that includes the steps of: positioning a workpiece and a tooling piece in a first position; moving at least one of the workpiece and the tooling piece toward the other such that the workpiece and the tooling piece occupy a second position; moving at least one of the workpiece and the tooling piece away from the other such that the workpiece and the tooling piece occupy a third position; and during at least a portion of the moving of the workpiece and/or the tooling piece from the first position to the second position and from the second position to the third position, using a power supply to apply a voltage across a gap formed between the workpiece and the tooling piece.

18 Claims, 6 Drawing Sheets

METHODS, SYSTEMS AND APPARATUS RELATING TO ELECTROCHEMICAL MACHINING

BACKGROUND OF THE INVENTION

This present application relates generally to methods, systems, and/or apparatus pertaining to polishing and/or machining metals. More specifically, but not by way of limitation, the present application relates to improved methods, systems, and/or apparatus pertaining to the electrochemical polishing and/or machining of metals, and, particularly, to the electrochemical polishing and/or machining of hard metals, including, for example, those metals used in manufacturing the blades of turbine engines.

In general, there are two primary alternative machining and polishing methods that are most commonly used for hard metals or materials that would otherwise be very difficult to machine with traditional techniques (i.e., those machining methods that rely on mechanical forces, such as turning, milling, grinding, drilling, etc.). These two methods are electrical discharge machining (hereinafter "EDM") and electrochemical machining (hereinafter "ECM). As one of ordinary skill in the art will appreciate, each of these alternative methods has advantages and disadvantages associated with its usage.

EDM is often called "spark machining" because it removes metal by producing a rapid series of repetitive electrical discharges. These electrical discharges are passed between an electrode and the piece of metal being machined. The small amount of material that is removed from the workpiece is flushed away with a continuously flowing fluid. The repetitive discharges create a set of successively deeper craters in the work piece until the desired shape is produced.

There are two primary EDM methods: ram EDM and wire EDM. The primary difference between the two involves the electrode that is used to perform the machining. In a typical ram EDM application, a graphite electrode is constructed with a specific-shaped and, being connected to a power source and a ram, is slowly fed into the workpiece. The entire machining operation is usually performed while submerged in a fluid bath. The fluid generally serves the following three purposes: 1) flushes material away; 2) serves as a coolant to minimize the heat affected zone (thereby preventing potential damage to the workpiece); and 3) acts as a conductor after breakdown for the current to pass between the electrode and the workpiece. In wire EDM, a very thin wire serves as the electrode. Special brass wires are typically used. The wire is slowly fed through the material and the electrical discharges cut the workpiece. Wire EDM also is usually performed in a bath of water. The wire itself does not touch the metal to be cut; the electrical discharges actually remove small amounts of material and allow the wire to be moved through the workpiece. A computer typically controls the path of the wire.

EDM may be used effectively to machine hard metals or metal alloys, such as titanium, hastelloy, kovar, and inconel, and, moreover, may be used cost-effectively to produce intricate or complex shapes. However, in applications that require a finished product with an exceptionally smooth surface, EDM has a significant disadvantage. In one aspect, this disadvantage includes the formation of a recast layer along the surface of an EDM machined part. A recast layer is a relatively thin surface layer that forms due to the heat of the EDM process. The heat softens areas of the part adjacent to the machined areas, which reharden after the EDM process is complete. The rehardening generally negatively affects the material properties of the metal. One of these negative effects is an increased surface roughness, as typically the rehardening causes the formation of surface defects, burrs, cracks, etc. As one of ordinary skill in the art will appreciate, for many industrial applications, including ones involving hot-path components in turbine engines, surface smoothness may be a prized characteristic. For example, in the case of some turbine engines, achieving a surface finishing of 10-15 RMS may significantly increase the efficiency of the engine, which, of course, is highly desirable in power generating applications. As a result, while EDM is a cost-effective and efficient method for many machining applications, often a second machining or polishing method is necessary to remove the recast layer and smooth the outer surface of the machined part.

ECM also uses electrical energy to remove material from metals. An electrolytic cell is created in an electrolyte medium with two separated electrodes: a tooling piece, which serves as the cathode, and a workpiece, which, being the part being machined by the process, serves as the anode. A high-amperage, low-voltage current is typically used to dissolve and remove material from the workpiece, which, similar to EDM, must be electrically conductive. ECM is essentially a deplating process that utilizes the principles of electrolysis.

During the process, the tooling piece, which, per conventional methods, must be uniquely formed for each different machining application, is positioned very close to the workpiece and a low voltage is applied across the gap (hereinafter "inter-electrode gap") between the tooling piece and the workpiece. A typical ECM system circulates an electrolyte through the inter-electrode gap such that a high amperage DC current is passed between the two electrodes. Material is removed from the workpiece and the flowing electrolyte solution washes the ions away. These ions form metal hydroxides that, generally, are removed from the electrolyte solution by centrifugal separation. Both the electrolyte and the metal sludge may then be recycled. Unlike traditional cutting methods, workpiece hardness is not a factor, making ECM, like EDM, suitable for difficult-to-machine materials.

There are several advantages associated with ECM. First, the components are not subject to either thermal or mechanical stress during the machining process. As such, unlike EDM, no recast layer is formed. Second, there is no tool wear during the process. The tooling piece, thus, may be used repeatedly without suffering significant wear. Once a specialized tool piece or tool is formed, complex geometrical shapes may be machined repeatedly and accurately by the same tooling piece. Third, ECM may be used to machine or polish surfaces to a very high level of smoothness. In general, surface smoothness of 10-15 RMS or less are achievable.

However, as one of ordinary skill in the art will appreciate, ECM has disadvantages as well. In general, ECM is time-consuming and expensive when compared to other machining methods. This is generally due to the fact that specialized ECM tooling pieces must be constructed for use with each component or part being machined. In addition, as described in more detail below, the complexity of these tooling pieces is generally increased due to the numerous flow channels that are required. Further, a conventional ECM machine is complex and relatively expensive due to the required precise computer controlled movement of the tooling piece relative to the workpiece under high fluid pressure.

Though the invention described herein is not limited to this usage, an example is provided below that focuses on the machining of turbine engine blades. It will be appreciated that this is provided as an example only and that the present invention is not so limited. This example, however, will demonstrate how machining according to the present application may be used to reduce machining costs and increase machining efficiency, particularly for applications similar to the example turbine engine application described.

Turbine engines generally have many stages of rotor and stator blades that may be found in either the compressor, if present, or the turbine section of the engine. Each of these blades has its own set of aerodynamic criteria and, because of this, the blades within each row have their own distinct shape. It will also be appreciate that, as stated, a higher level of surface smoothness generally increases the aerodynamic performance of the blades, which, thereby, improves the overall performance or efficiency of the engine. Given the level of desired smoothness, ECM presents a preferred alternative for machining or polishing the outer surfaces of the blades. Further, for blades that have undergone EDM as part of their fabrication process, ECM provides an attractive alternative for removing the thin outer-layer of recast. This may be done such that, once the recast is removed, a smooth surface remains that performs well in a turbine engine. In this manner, ECM and EDM processes may be used to compliment each other, i.e., EDM may be cost-effectively used for the bulk of the required machining while ECM may be used to produce a finely polished surface of the type that is especially valued in turbine engine applications.

However, because of the many different shapes of blades needed for a turbine engine, conventional ECM becomes a relatively expensive process. In general, the reason for this is that an unique set of ECM tooling pieces is required for each of the many different types of blades that are used within the turbine engine. When the time and cost required for the production of the required tooling pieces is factored into the cost of the ECM machine and the time and cost related to the ECM process itself, ECM often becomes cost-prohibitive for applications of this nature. This is particularly true in industries where parts and components are regularly redesigned or tweaked such that new tooling pieces may be regularly required. As a result, there is a need for improved methods, systems, and/or apparatus relating to ECM processes and ECM machines, and, particularly methods, systems, and/or apparatus that allows ECM machines and processes to be more cost-effective and efficient in terms of initial machine costs, the tooling piece production costs, and/or the labor and time associated with its usage.

BRIEF DESCRIPTION OF THE INVENTION

The present application thus describes a method of electrochemical machining that may include the steps of: positioning a workpiece, which comprises an anode, and a tooling piece, which comprises a cathode, in a first position; moving at least one of the workpiece and the tooling piece toward the other such that the workpiece and the tooling piece occupy a second position; moving at least one of the workpiece and the tooling piece away from the other such that the workpiece and the tooling piece occupy a third position; and during at least a portion of the moving of the workpiece and/or the tooling piece from the first position to the second position and from the second position to the third position, using a power supply to apply a voltage across a gap formed between the workpiece and the tooling piece.

The present application further describes an electrochemical machining system that may include: a workpiece, which comprises an anode, and a tooling piece, which comprises a cathode; a tank in which the workpiece and the tooling piece may be submerged in an electrolyte; means for controlling the motion of the workpiece in relation to the tooling piece while the workpiece and the tooling piece are in the tank; and means for applying a voltage across a gap between the workpiece and the tooling piece. The means for controlling the motion of the workpiece in relation to the tooling piece may be configured to: position the workpiece and the tooling piece in a first position; move at least one of the workpiece and the tooling piece toward the other such that the workpiece and the tooling piece occupy a second position; move at least one of the workpiece and the tooling piece away from the other such that the workpiece and the tooling piece occupy a third position. The means for applying a voltage across a gap between the workpiece and the tooling piece may be configured to apply a voltage across a gap formed between the workpiece and the tooling piece during at least a portion of the moving of the workpiece and/or the tooling piece from the first position to the second position and from the second position to the third position.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

As described herein, an electrochemical machining ("ECM") process in accordance with embodiments of the present application may provide a relatively high-speed electrolytic reaction that removes an outer layer from a workpiece quickly such that the post-machining surface is highly polished. An ECM process in accordance with embodiments described herein also may be used to efficiently remove the recast layer that typically forms during electrical discharge machining (EDM). In certain embodiments, as described below, the present application provides an ECM system that employs a cyclic motion between the workpiece and tooling piece to produce the required flow of electrolytes, which may allow for simplified tooling piece construction and/or the elimination of the high-pressure pumping system that is typically used in conventional systems. In addition, in certain embodiments of the present application, a modified flexible tooling piece may allow a single tooling piece to be used on many differently shaped workpieces. In some embodiments, pulsed currents may be used to adjust the concentrations of various machining products in the inter-electrode gap, which may be used for diffusion-controlled erosion.

Figure 1:
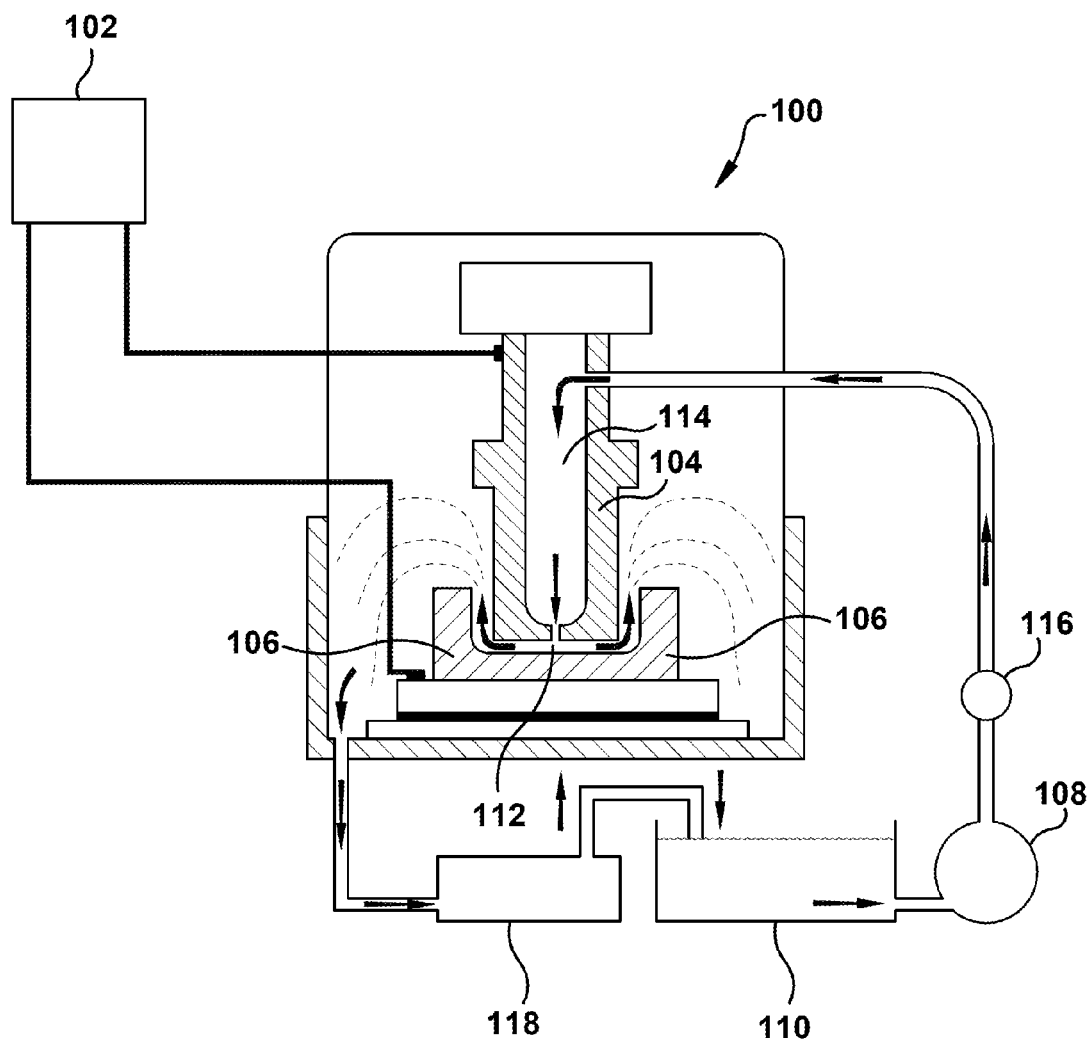
FIG. 1 is a schematic representation of an ECM system according to conventional design.

Referring now to FIG. 1, an ECM system 100 according to conventional design is illustrated. As will be appreciated, the major components of the ECM system 100 include a power supply 102, a cathode or tooling piece 104, an anode or workpiece 106, an electrolyte pump 108, and an electrolyte tank 110. In operation, as one of ordinary skill in the art will appreciate, the tooling piece 104 and the workpiece 106 are positioned (and repositioned as the machining process continues) such that a relatively narrow inter-electrode gap 112 is defined by the space between them. The power supply 102 is then used to apply a voltage across the workpiece 106 and tooling piece 104, i.e., the anode and cathode, respectively, of the electrolytic cell that is formed.

The ECM system 100 may include an electrolyte system, which, as shown, operates to pump a continuous stream of pressurized electrolyte into the inter-electrode gap 112. A suitable electrolyte, for example, aqueous sodium chloride (table salt) solution, is chosen so that the shape of the tooling piece 104 remains substantially unchanged during the machining process. The electrolyte is pumped from the electrolyte tank 110 by the pump 108 and delivered to the tooling piece 104 at a relatively high rate and pressure. Generally, the electrolyte is introduced into the inter-electrode gap 112 through the tooling piece 104. This is typically done via one or more hollow electrolyte channels 114 that are formed within the tooling piece 104, as illustrated in FIG. 1. The electrolyte channels 114 direct the electrolyte toward the workpiece 106. From the electrolyte channel 114, the electrolyte exits the tooling piece 104 and flows through the space defined by the inter-electrode gap 112. In this manner, the electrolyte may be made to move through the inter-electrode gap 112 at a relatively high rate and pressure.

It will be appreciated that fabricating an unique tooling piece 104, i.e., one having the required shape and the necessary electrolyte channels 114 configured within it, is typically a significant endeavor, particularly when an unique tooling piece 104 must be created for each different part shape. In addition, in many applications, edges along the exterior of the workpiece 106/tooling piece 104 assembly must be sealed. This is typically done so that desired electrolyte flow patterns, rates and pressures are created and maintained through inter-electrode gap 112 during the machining process. Further, the tooling piece 104 must be positioned such that the necessary inter-electrode gap 112 is maintained between it and the workpiece 106 as the workpiece 106 is being machined. This generally includes a control system that gradually moves the tooling piece 104 toward the workpiece 106 as it is being machined. This may include movement along a single axis or two axes. It will be appreciated that these requirements generally make conventional ECM processes complex. As one of ordinary skill in the art will appreciate, this generally makes it a time-consuming and costly machining method, particularly where the anticipated number of manufactured components is low or where the number of differently shaped parts that need machining is high.

In operation, metal removal is achieved by electrochemical dissolution of the anodically polarized workpiece 106, which, as stated, is one part of an electrolytic cell in ECM. Hard metals can be shaped electrolytically by using ECM and the rate of machining generally does not depend on their hardness. The tooling piece 104, i.e., the other electrode in the electrolytic cell in ECM, used in the process does not wear, and therefore, soft metals may be used as tools to form shapes on harder workpieces, unlike conventional machining methods. As one of ordinary skill in the art will appreciate, ECM may be used to smooth surfaces, drill holes, form complex shapes, and remove fatigue cracks in steel structures.

During operation, the electrolyte moving through the inter-electrode gap 112 removes the electrochemical dissolution material from the workpiece 106. In addition, the flow of electrolyte diminishes unwanted effects, such as those that arise with cathodic gas generation and electrical heating. The rate at which metal is removed from the anode (i.e., the workpiece) 106 is approximately in inverse proportion to the distance between the electrodes. As machining proceeds, and with the simultaneous movement of the cathode at a typical rate toward the anode, the width of the inter-electrode gap 112 along the electrode length will gradually tend to a steady-state value. Under these conditions, a shape, roughly complementary to that of the cathode, will be reproduced on the anode. A typical gap width may be about 0.0004 meters.

The pump 108 generally provides fluid power throughout the system. The electrolyte system, of which the pump 108 is part, may include other conventional components that enhance its operation. For example, a valve 116 may be positioned upstream of the pump 108 for regulating the rate of flow and pressure of the electrolyte that is delivered to the inter-electrode gap 112. A conventional filter 118 also may be included. The filter 118 typically is located downstream of the inter-electrode gap 112 and filters out the material removed from the workpiece 106 such that the electrolyte may be returned to the tank 110 clean of impurities and ready for reuse.

Figure 2:
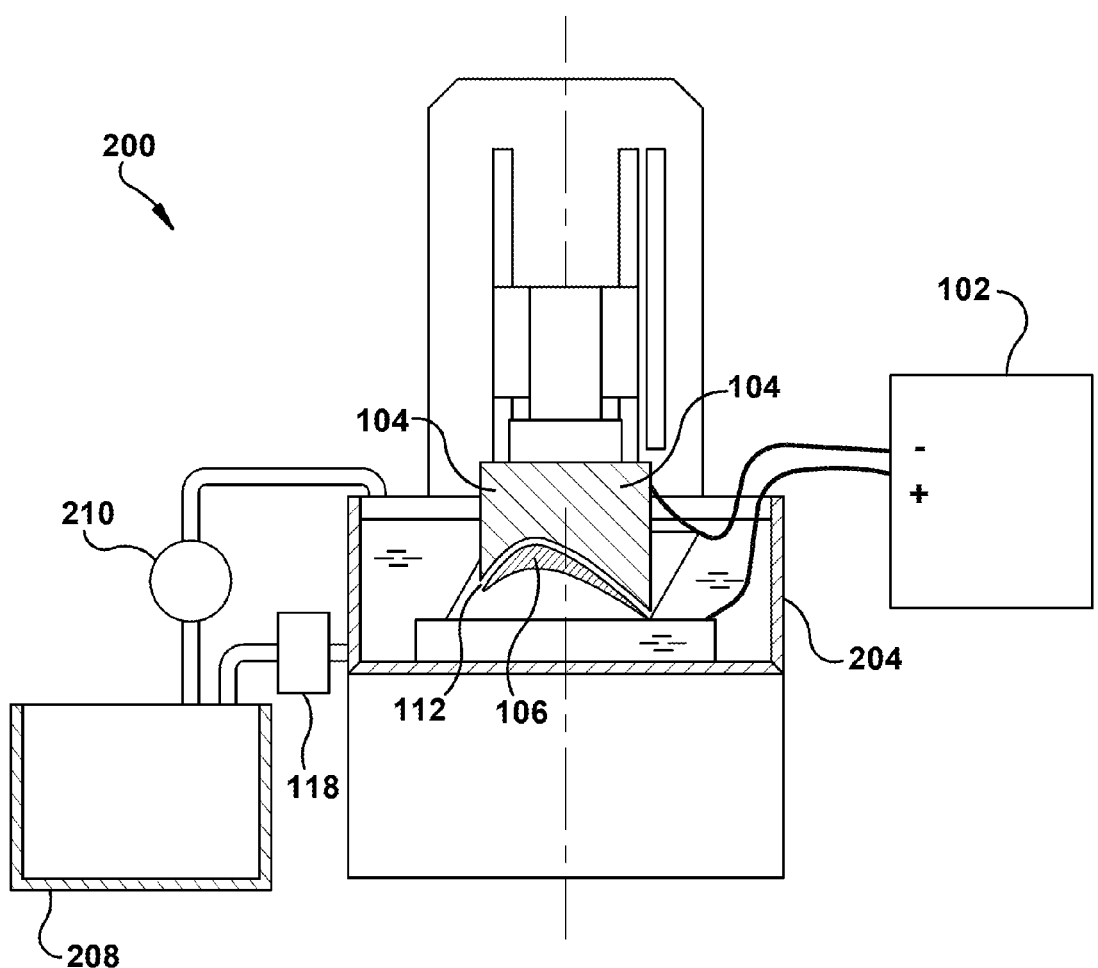
FIG. 2 is a schematic representation of an ECM system according to an exemplary embodiment of the present application.

Referring now to FIG. 2, an ECM system 200 according to an exemplary embodiment of the present application is illustrated. As will be appreciated, the ECM system 200 may include many of the same components as shown for the conventional system in FIG. 1, including a power supply 102, a tooling piece 104, and a workpiece 106. As shown, the workpiece 106 may be a turbine blade. Though, in some embodiments, the present invention is particularly well suited to perform surface machining or polishing of turbine blades (thereby creating a smooth surface of the nature valued in turbine engine applications and/or removing a recast layer that formed, for example, during a prior EDM process), the description herein of this particular application is exemplary only. Those of ordinary skill in the art will appreciate that applications of this nature and others are also possible.

The tooling piece 104 may be constructed with a surface contour that produces the desired machining effect in the workpiece 106. As illustrated, in the case of a turbine blade, the tooling piece 104 may have a surface contour that substantially mirrors the surface contour of the workpiece 106. Accordingly, as shown in FIG. 2, a concave face of the tooling piece 104 may reside in spaced relation to the convex suction side of the turbine blade (i.e., the workpiece 106) and across the inter-electrode gap 112. If the reverse side of the turbine blade were being machined (not shown), the tooling piece would have a convex face that resided in spaced relation to the concave pressure side of the turbine blade and across the inter-electrode gap 112 therefrom. However, as provided herein in relation to certain embodiments of the present invention, the surface contour of the tooling piece 104 does not have to exactly match the contour of the turbine blade workpiece. This is because, in certain cases, an exact contour match is not necessary in polishing applications where only a thin outer layer is removed. In these instances, only an approximate contour match is necessary. Because of this, according to the present invention, a single tooling piece 104 may potentially be used with many workpieces 106 that have somewhat different but similar surface contours. This, for example, is particularly advantageous in machining turbine blades because often blades of neighboring stages are similar to each other but have slight modified aerodynamic contours.

As also mentioned, the tooling piece 104 may be made of a variety of materials. According to embodiments of the present application, preferably, the tooling piece 104 may be constructed using any of the following materials: copper, stainless steel and other similar types of metals and materials. The workpiece 106 typically is a hard metal. The types of metals that typically might be machined per the systems and methods of the present application include titanium, hastelloy, kovar, inconel, stainless steel, and carbon steel. Other materials also may be machined using this process. The electrolyte solution may be any conventional electrolyte solution. Typically, the electrolyte solution may be aqueous sodium nitrate at vary levels of concentration.

The ECM system 200 may include an electrolyte system. In some embodiments, the electrolyte system is different than the one described in relation to the conventional system of FIG. 1. In short, the electrolyte system of the ECM system 200 of FIG. 2 may be simplified over conventional design because the high-pressure, directed flow of electrolyte solution is not necessary. Instead, as illustrated in FIG. 2, the electrolyte may fill a work tank 204 such that the workpiece 106 and tooling piece 104 are submerged during the machining process. As discussed in more detail below, from the work tank 204, the electrolyte may be pumped or drained to another tank, an electrolyte reservoir 208. In doing so, the electrolyte may pass through a conventional filter 118. The filter 118 removes the material machined from the workpiece 106 such that, after filtration, the electrolyte may be reused. The filter 118 may be located between the work tank 204 and the electrolyte reservoir 208, though other locations are also possible. Types of filters that may be used for this filtering application include bag filters, cartridge filters and/or other conventional filtering systems. Typically, ECM applications in accordance with the present applications generate a relatively small amount of electrolytic sludge, which generally means the filtering system may be a relatively low cost and capacity system. From the electrolyte reservoir 208, the filtered electrolyte may be returned to the work tank 204. A pump 210 may be used for this. However, because of the operation of the ECM system 200, as described in more detail in relation to FIG. 3, the pump 210 is not required to pump the electrolyte to a precise location within the inter-electrode gap 112 under a relatively high flow rate and pressure. Instead, the pump 210 merely is required (in some embodiments) to refill the work tank 204 at a low pressure such that the tooling piece 104 and workpiece 106 are again submerged by electrolyte. Further, since it is not necessary to direct the electrolyte to a precise location within the inter-electrode gap 112 at a high pressure (as is the case with the system of FIG. 1), many pipes, hoses, fittings, and/or connections, etc. may be eliminated from the system. The hollow electrolyte channels 114 that cut through the workpiece 106 also may be no longer needed with embodiments of the present application. As one of ordinary skill in the art will appreciate, this generally simplifies construction of the system and tooling piece 104.

FIG. 3 illustrates the function of the ECM system 200 according to an exemplary embodiment of the present application. FIGS. 3(a) through 3(f) show the movement of the tooling piece 104 in relation to the workpiece 106 during the operation of a system in accordance with an embodiment of the present application. In FIG. 3(a), the tooling piece 104 is in an initial up or raised position. In this position, the inter-electrode gap 112 is wide and, generally, too wide for machining to occur. It may also be said that the electrodes, i.e., the tooling piece 104 and the workpiece 106, are in a separated position. In any event, in this position, the power supply (not shown in FIG. 3) does not apply a voltage across the gap. It will be appreciated that in FIG. 3(a), the electrolyte in the work tank 204 is substantially free from dissolution impurities.

Figure 3A:
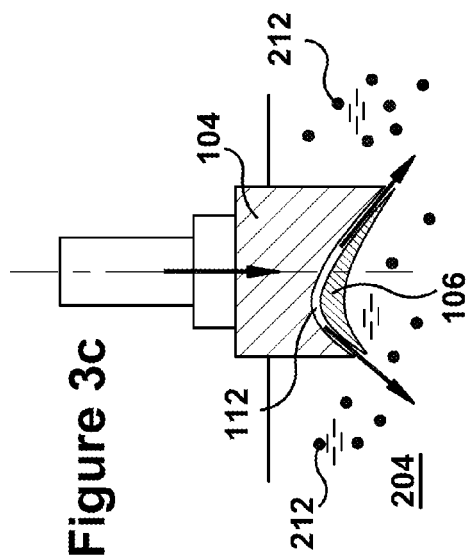
FIG. 3 is a schematic representation of an ECM system and an ECM process according to an exemplary embodiment of the present application.
Figure 3B:
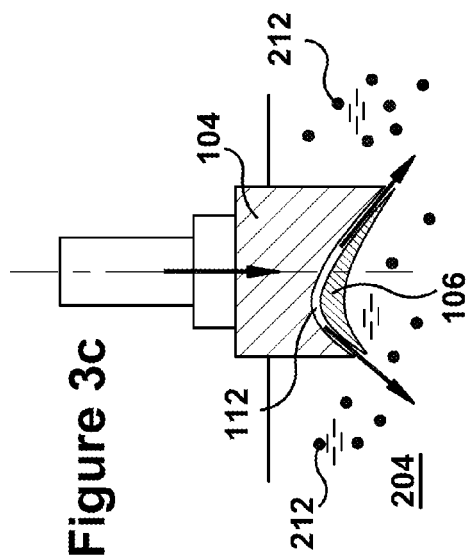

In FIG. 3(b), as indicated by the arrow, the tooling piece 104 is moved downward or toward the workpiece 106. The controlled downward motion may be achieved using conventional and available systems and machinery. For example, as one of ordinary skill in the art will appreciate, the following may be used: an electrical driving system based on motor and spindle; a hydraulic driving system based on piston and cylinder; and an electromagnetic driving system based on linear motor or bearings. Other conventional apparatus and systems also may be used. In some embodiments, the downward motion of the tooling piece 104 is relatively fast. In such embodiments, preferably, the downward speed of the tooling piece 104 may be between approximately 0.2 and 3.5 m/s. In more preferred embodiments, the downward speed of the tooling piece 104 may be between approximately 0.5 and 2.5 m/s. It will be appreciated that the downward motion of the tooling piece 104 narrows the space between the tooling piece 104 and the workpiece 106, ultimately forming a narrow space or an inter-electrode gap 112 between the electrodes. It also will be appreciated that the formation and narrowing of the inter-electrode gap 112 displaces the electrolyte from between the tooling piece 104 and the workpiece 106, as indicated by the arrows in FIGS. 3(b) and 3(c). This creates a flow of electrolyte between the tooling piece 104 and the workpiece 106. The flow generally is directed toward the periphery of the inter-electrode gap 112.

Figure 3C:
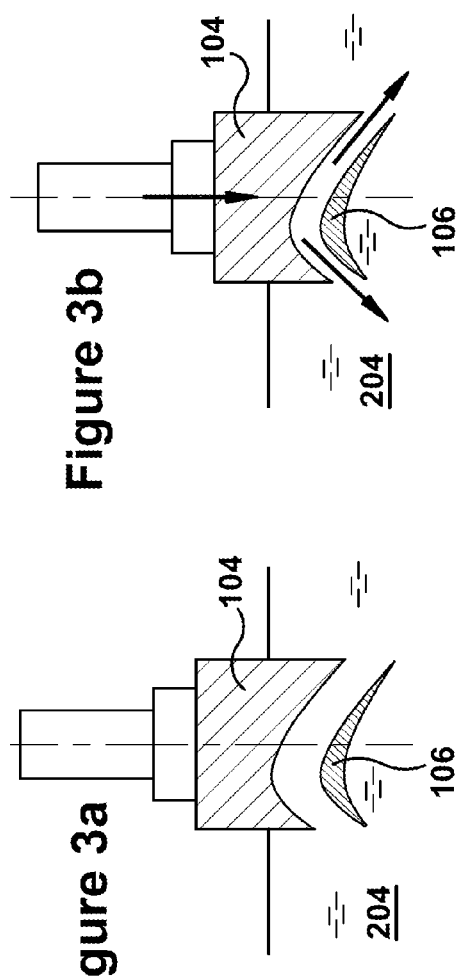

In FIG. 3(c), when the motion of the tooling piece 104 causes a narrowing of the inter-electrode gap 112 to a critical dimension, the power supply 102 may send electricity to the electrodes (i.e., the tooling piece 104 and the workpiece 106) such that a voltage across the inter-electrode gap 112 is created, which begins the electrolytic dissolution of the workpiece 106. The residue from the electrolytic dissolution, i.e., machined particles 212, may be flushed into the work tank 204 by the flow of electrolytes from the inter-electrode gap 112.

In some embodiments, the application of electricity from the power supply 102 may be continuous such that a relatively uninterrupted voltage is applied across the inter-electrode gap 112 for a desired period of time. In such embodiments, the uninterrupted voltage applied across the inter-electrode gap 112 may be between approximately 12 and 20 V. More preferably, in these embodiments, the uninterrupted voltage applied across the inter-electrode gap 112 is between approximately 15 and 18 V. In other embodiments, the application of electricity from the power supply 102 across the inter-electrode gap 112 may be applied as a series of discrete pulses. In this case, a voltage is applied across the inter-electrode gap 112 for a short duration of time (i.e., a "pulse"), followed by no voltage being applied across the inter-electrode gap 112 for another short duration of time. This "on/off" cycle is then repeated a desired number of times. In one preferred embodiment, a cycle may include a voltage of between approximately 15 and 30 V being applied across the inter-electrode gap 112 for between approximately 0.05 and 0.3 seconds followed then by no voltage being applied across the inter-electrode gap 112 for between approximately 0.1 and 0.3 seconds. In this instance, the power supply 102 may execute between 10 and 100 number of cycles before terminating the pulses. More preferably, in another embodiment, a cycle may include a voltage of between approximately 22 and 28 V being applied across the inter-electrode gap 112 for between approximately 0.08 and 0.2 seconds followed then by no voltage being applied across the inter-electrode gap 112 for between approximately 0.12 and 0.3 seconds. In this case, the power supply 102 may execute between 20 and 50 number of cycles before terminating the pulses. It has been determined that in some applications using a pulsed power supply better electrolyte flow and surface quality. The pulse interval also may allow for better flushing of the dissolution materials.

In other embodiments, as discussed in more detail below, variable levels of voltage may be applied in other manners. This may include varying the amplitude of the voltage, the time between pulses, the critical dimensions, as well as other variables. It will be appreciated that the application of voltage as described above may be accomplished using conventional machinery and electrical systems, coupled with a computer implemented control system. For example, as one of ordinary skill in the art will appreciated, the following may be used to implement such a system: a switch mode power supply, metal oxide semiconductor field, effect transistor (MOSFET), and/or insulated-gate bipolar transistor (IGBT) among other electronic control devices and technologies.

Figure 3D:
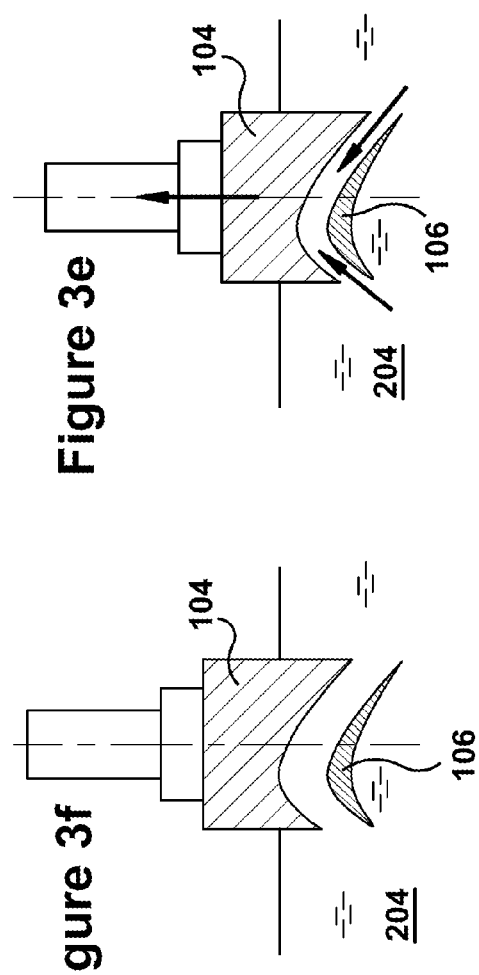

When the motion of the tooling piece 104 toward the workpiece 106 causes a narrowing of the inter-electrode gap 112 to a second critical dimension, the motion of the tooling piece 104 may be halted and the voltage applied across the electrodes may be terminated. The second critical dimension may comprise a dimension wherein the inter-electrode gap 112 is relatively very narrow (more narrow than the first critical dimension). It will be appreciated that, in this halted position, most or all of the electrolytic dissolution, i.e., particles 212, will have been flushed from between the electrodes into the other parts of the work tank 204, as illustrated in FIG. 3(d).

At this point, in one preferred embodiment, the electrolytes in the work tank 204 are filtered. In this manner, the particles 212 from the electrolytic dissolution may be removed such that they do not interfere with further electrochemical machining. As such, the electrolytes in the work tank 204 may be drained to the electrolyte reservoir 208 and passed through a conventional filter 118 where the particles are removed. Conventional filtering devices and techniques may be used for this, including, for example, bag filters, cartridge filters, and other similar devices. Thereby filtered, the electrolytes may be returned to the work tank 204 for more machining. This may be accomplished with a conventional pump 210 or, depending on the placement of the electrolyte reservoir 208, simple drainage. It will be appreciated that filtering of the electrolytes may be accomplished other ways. Also, in some applications, repeated use of electrolytes without filtering may be possible, or replacement of electrolytes with unused electrolytes also may be done.

Figure 3E:
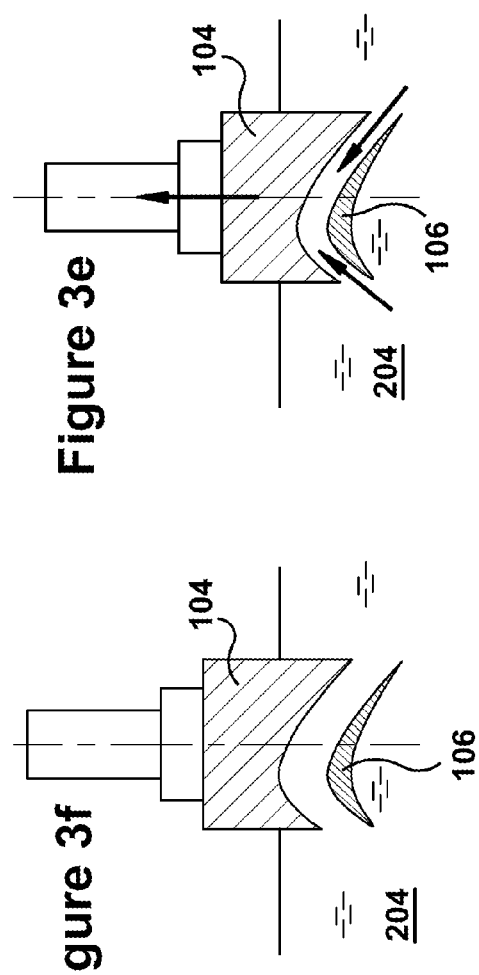
Figure 3F:
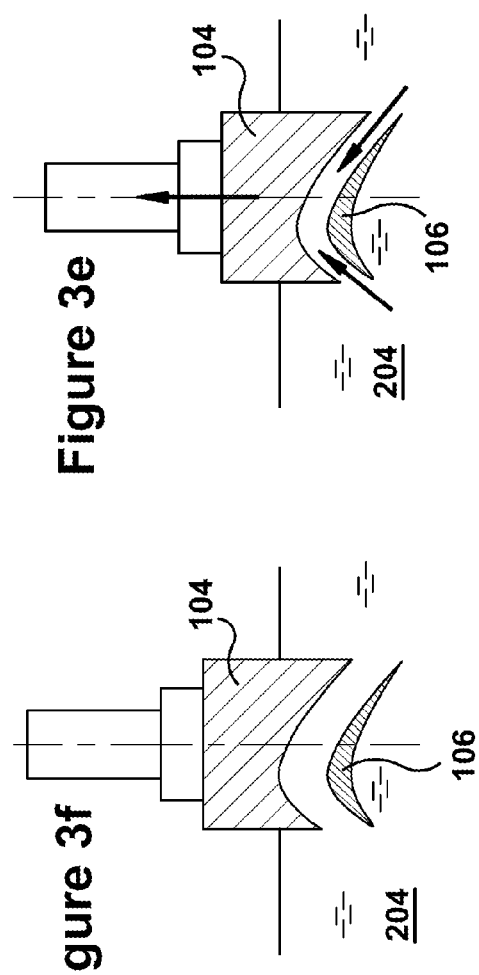

FIGS. 3(e) and 3(f) illustrate the tooling piece 104 returning to its initial position. In FIG. 3(e), the tooling piece 104 moves away from a workpiece 106. This allows the inflow of filtered electrolytes, which provides the electrolytes for the next machining cycle. In FIG. 3(f), the tooling piece 104 has reached its initial position and is prepared for another ECM cycle pursuant to the invention described herein.

As used herein, an "ECM cycle" is meant to generally refer to some or all of the steps provided in FIGS. 3(a) through 3(f). That is, an "ECM cycle" according to the present invention is meant to refer broadly to a cycle wherein two ECM electrodes are brought together from a separated position to a position of close proximity, applying a voltage across an inter-electrode gap that is formed between the two ECM electrodes, and then returning the electrodes to a separated position. A "separated position" refers to any positioning of the electrodes wherein a relatively large gap in terms of ECM exists between them, i.e., a gap large enough such that either ECM machining is not possible, not practicable, or not desired by system operators. A "position of close proximity" refers to any positioning of the electrodes wherein either ECM machining is possible, practicable, or desired by system operators.

It will be understood that, pursuant to the several embodiments of the current application, the ECM cycle may be performed in a plurality of ways depending on the differing criteria that may exist for specific applications. Several of these methods are described presently. However, it will be appreciated by one of ordinary skill in the art that these are exemplary only and that other variations are also possible.

In a first preferred embodiment (aspects of which were already discussed in more general terms in relation to FIG. 3), the electrodes may begin in a separated position. From this position, the tooling piece 104 may be moved toward the workpiece 106 such that, upon attaining a position of close proximity, an inter-electrode gap 112 is formed between the tooling piece and the workpiece. When the motion of the workpiece causes the inter-electrode gap to reach a first critical dimension (which may represent, for example, a minimum distance across the inter-electrode gap between the tooling piece and the workpiece, an average distance across the inter-electrode gap between the tooling piece and the workpiece, or some other dimension that relates the proximity of the tooling piece to the workpiece or the distance across the inter-electrode gap), voltage may be applied across the inter-electrode gap by the power supply. Depending on the application, the voltage may be applied in a number of different manners. These may include applying: an uninterrupted voltage with a regular amplitude, an uninterrupted voltage with a varying amplitude, a pulsed voltage with a regular amplitude, a pulsed voltage with a varying amplitude, some combination of a pulsed voltage and an uninterrupted voltage, and others. The tooling piece may continue to move toward the workpiece while the voltage is being applied until a second critical dimension is reached. At the second critical dimension, the motion of the tooling piece may be halted and the voltage being applied across the inter-electrode gap may be stopped. The tooling piece then may be returned to a separated position. As stated above, in some embodiments, the tooling piece may remain in the stopped position (i.e., at the second critical dimension) until the work tank is drained and the electrolyte filtered or replaced, and then be returned to the separated position. In other embodiments, the tooling piece may be returned to the separated position immediately or after a short period of being halted, and before the draining/filtering/replacing of the electrolyte is completed. It will be appreciated that the several alternatives for returning the tooling piece to the separated position are possible for the other embodiments described below. In relation to the first preferred embodiment, in certain cases, the first critical and second critical dimension may represent the approximate distance between the surface of the tooling piece and the surface of the workpiece and, preferably, the first critical dimension may have a value of between 0.0008 and 0.0004 meters and the second critical dimension may have a value of between 0.0004 and 0.0001 meters.

In a second preferred embodiment, the electrodes also begin in a separated position. The tooling piece 104 may be moved toward the workpiece 106 such that, upon attaining a position of close proximity, an inter-electrode gap 112 is formed between the tooling piece and the workpiece. When the motion of the workpiece causes the inter-electrode gap to reach a first critical dimension, voltage (constant, pulsed, varying amplitude, etc.) may be applied across the inter-electrode gap by the power supply. The tooling piece may continue to move toward the workpiece while the voltage is being applied until a second critical dimension is reached. At the second critical dimension, the motion of the tooling piece may be halted. Different from the first embodiment, however, the voltage may continue to be applied for a predetermined period of time while the tooling piece is stationary. The voltage may then be stopped after the predetermined period of time expires. The tooling piece then may be returned to the separated position pursuant to any of the alternatives described above. In relation to the second preferred embodiment, in certain cases, the first critical and second critical dimension may represent the approximate distance between the surface of the tooling piece and the surface of the workpiece and, preferably, the first critical dimension may have a value of between 0.0005 and 0.0004 meters and the second critical dimension may have a value of between 0.00025 and 0.00015 meters.

In a third preferred embodiment, the electrodes again begin in a separated position. The tooling piece 104 may be moved toward the workpiece 106 such that, upon attaining a position of close proximity, an inter-electrode gap 112 is formed between the tooling piece and the workpiece. When the motion of the workpiece causes the inter-electrode gap to reach a first critical dimension, voltage (constant, pulsed, varying amplitude, etc.) may be applied across the inter-electrode gap by the power supply. The tooling piece may continue to move toward the workpiece while the voltage is being applied until a second critical dimension is reached. At the second critical dimension, the motion of the tooling piece may continue, while the voltage is stopped. The tooling piece may continue to move toward the workpiece (with no voltage applied) until a third critical dimension is reached. This additional movement without voltage being applied may better flush the inter-electrode gap of electrolytic dissolution material. At the third critical dimension, the motion of the tooling piece may be stopped. The tooling piece then may be returned to the separated position pursuant to any of the alternatives described above. In relation to the third preferred embodiment, in certain cases, the first critical, second critical, and third critical dimension may represent the approximate distance between the surface of the tooling piece and the surface of the workpiece and, preferably, the first critical dimension may have a value of between 0.0008 and 0.0004 m, the second critical dimension may have a value of between 0.0004 and 0.0003 m, and the third critical dimension may have a value of between 0.0003 and 0.0001 m.

In a fourth preferred embodiment, the electrodes again begin in a separated position and the tooling piece 104 is moved toward the workpiece 106 such that, upon attaining a position of close proximity, an inter-electrode gap 112 is formed between the tooling piece and the workpiece. When the motion of the workpiece causes the inter-electrode gap to reach a first critical dimension, voltage (constant, pulsed, varying amplitude, etc.) may be applied across the inter-electrode gap by the power supply. The tooling piece may continue to move toward the workpiece while the voltage is being applied until a second critical dimension is reached. At the second critical dimension, the motion of the tooling piece may be halted. At this point, the tooling piece: 1) may pause for a predetermined period of time while the voltage continues and then reverse direction while voltage is still being applied; or 2) may reverse direction without pausing while voltage continues to be applied. The voltage may continue with the tooling piece moving away from the workpiece until a third critical dimension is reached, which, in some embodiments, may be approximately the same as the first critical dimension. After the third critical dimension is reached, the voltage is terminated and tooling piece then may be returned to the separated position pursuant to any of the alternatives described above. In relation to the fourth preferred embodiment, in certain cases, the first critical, second critical, and third critical dimension may represent the approximate distance between the surface of the tooling piece and the surface of the workpiece and, preferably, the first critical dimension may have a value of between 0.0008 and 0.0004 m, the second critical dimension may have a value of between 0.0004 and 0.0001 m, and the third critical dimension may have a value of between 0.0008 and 0.0004 In.

While the exemplary embodiments described herein state that the tooling piece is moved toward a stationary workpiece, it will be appreciated that in an alternative embodiment of the present application, the tooling piece may remain stationary while the workpiece is moved toward it. Or, in another embodiment, both may be moved toward each other.

In operation, it will be appreciated that in use the ECM system 200 as provided in FIGS. 2 and 3 and the accompanying text may be used to machine or polish the surface of the workpiece 106 in an efficient and cost-effective manner. One way this is accomplished is by simplifying the structure of the tooling piece. It will be appreciated that in embodiments of the present invention no electrolyte guiding channels are required. It will be further appreciated that the need to seal around the reaction zone is eliminated or significantly decreased. In addition, while in some embodiments of the present invention a pump may be needed by the system to drain/filter/replace the electrolyte in the work tank after machining, the high-pressure pump generally required in conventional systems may be eliminated. This is because the bringing together of the tooling piece and the workpiece generally creates the required flow of electrolyte in the inter-electrode gap instead of a high-pressure pump pumping electrolyte into the gap.

In one application of the present invention, as stated, the system may be used to remove a thin outer layer of metal from turbine blades, as illustrated in FIGS. 2 and 3. As turbine engines evolve with greater size and hotter temperatures, the materials used for the blades necessarily have to be made harder and more resistant, making traditional methods of machining difficult or unworkable. For example, newer blade technologies often include the use of inconel, which is extremely resistant to most machining methods. EDM, however, has been used to machine inconel with success. However, EDM, as stated, generally leaves behind a thin layer of recast that negatively affects surface smoothness and other material properties. This recast layer should be removed for better functioning of the blade in the turbine engine.

It has been determined that embodiments of the present application are particularly adept at removing this layer in a cost-effective manner and provide a highly smooth finished product. Turbine blades having this type of a smooth, polished surface may result in a 1% improvement in engine efficiency. In an industry where efficiency improvements of much smaller degrees are prized, this is significant. The present invention has the ability to deliver highly polished surfaces using a simplified, less expensive ECM machining system, and may be used on any of the harder new materials, including inconel.

Referring again to the drawings, FIGS. 4 through 7 illustrate a flexible cathode or flexible tooling piece 300 pursuant to an exemplary embodiment of the present application. It will be appreciated that the flexible tooling piece 300 presents an alternative system or method for providing cost-effective and/or efficient ECM processes. For example, as described in detail below, the flexible tooling piece 300 may provide a tooling piece that has the ability of being used on a variety of different shaped workpieces. As one of ordinary skill in the art will appreciate and as discussed above, among other advantages, this generally reduces the costs associated with ECM processes by eliminating or reducing the need to manufacture an unique tooling piece for each ECM application. The ECM processes described in relation to FIGS. 2 and 3 also were described as providing a level of tooling piece interchangeability. However, in many of the embodiments associated with the flexible tooling piece 300 of FIGS. 4 through 7, a greater level interchangeability may be provided and, with that, the ability to use a single tooling piece on a greater range of workpiece shapes.

Figure 4:
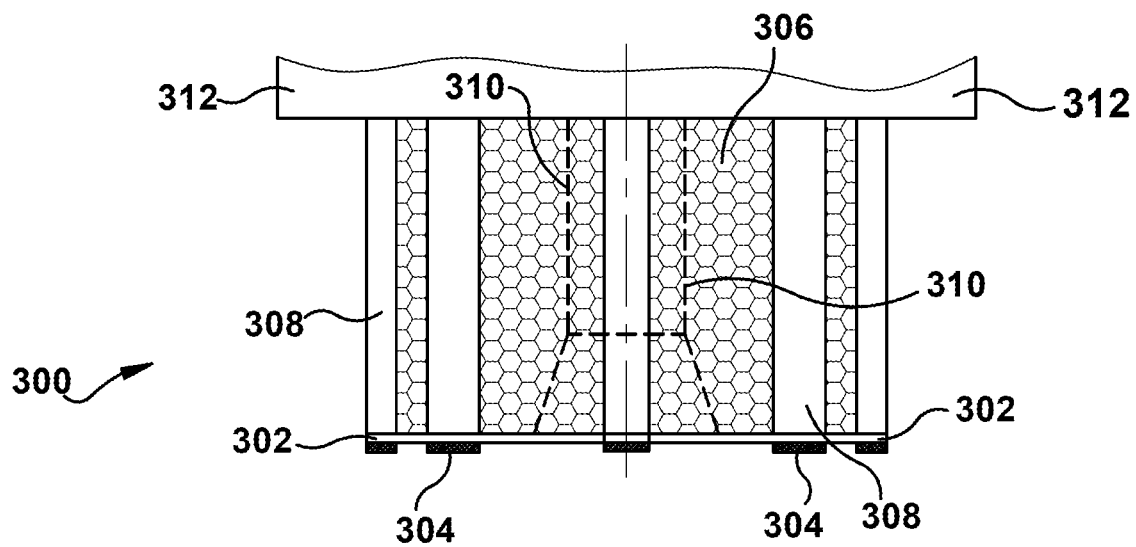
FIG. 4 illustrates a side view of a flexible tooling piece according to an exemplary embodiment of the present application.
Figure 5:
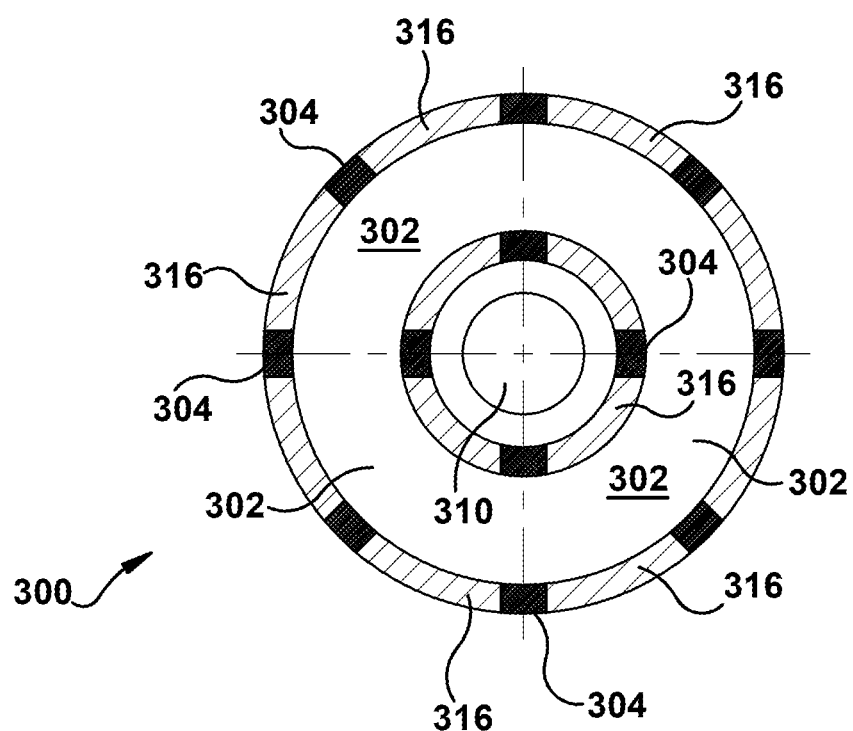
FIG. 5 illustrates a top view of the flexible tooling piece of FIG. 4.

As shown in FIGS. 4 and 5, the components of the flexible tooling piece 300 according to an exemplary embodiment of the present application may include: an outer cathode surface 302; one or more spacer pads 304; an elastomeric backing 306; one or more conducting strips 308; and one or more electrolyte channel 310. These components (all of which may not be present in other exemplary embodiments of the present invention) may be positioned on the distal end of a machine ram 312 or other machine component that operates to move or position the flexible tooling piece 300 such that the flexible tooling piece 300 engages a workpiece 106 in a desired manner. This positioning may include movement along multiple axes and/or rotation, and may completed by any of the systems and/or machinery that were described above in relation to FIGS. 2 and 3.

In accordance with an exemplary embodiment of the present invention, the outer cathode surface 302 generally comprises a flexible, electrical conducting material. In some preferred embodiments, copper or stainless steel may be used for the outer cathode surface 302, though other materials or metals also may be used. As shown in FIG. 5, the outer cathode surface 302 may have a doughnut shape, a circular shape with a circular shaped cutout in the center. As one of ordinary skill in the art will appreciate, other shapes, such as square, oval, rectangular, triangular, pentagonal, etc., for both the overall shape and the cutout shape may be used. As shown, the outer cathode surface 302 may have a relatively thin thickness. In some embodiments, the thickness of the outer cathode surface 302 may be between approximately 0.00005 and 0.0005 m. More preferably, the thickness of the outer cathode surface 302 may be between approximately 0.0001 and 0.0002 m.

In general, the elastomeric backing 306 provides an elastic backing or support to the outer cathode surface and is generally positioned in the space between the machine ram 312 and the outer cathode surface 302. As one of ordinary skill in the art will appreciate this elastic backing or support may be provided in a variety of ways. For example, the elastomeric backing 306 may comprise solid elastic material. In addition, the elastomeric backing 306 may comprise a flexible outer membrane that is filled with either air or a liquid. In addition, the elastomeric backing 306 may comprise a mechanical system or a hydraulic arrangement that performs in similar fashion.

As stated, the elastomeric backing 306 provides elastic support to the outer cathode surface 302. In this arrangement, the elastomeric backing 306 provides support to the outer cathode surface 302 while also allowing the outer cathode surface 302 to deform so that, in operation, the outer cathode surface 302 may conform to the surface contour of the workpiece 106. More particularly, the elastic support provided by the elastomeric backing 306 may be configured such that an anticipated pressure against the outer cathode surface 302 elastically deforms the outer cathode surface 302 a desired amount (the operation of which will become more apparent upon review of FIG. 6) and, then, when the pressure against the outer cathode surface 302 is relieved, the elastomeric backing 306 returns the outer cathode surface 302 to its approximate original shape.

It will be appreciated that the extent of the deformation and the amount of pressure required to cause the deformation may be controlled by the choice of material and/or the configuration or components of the hydraulics or mechanical components, etc. that are used as the elastomeric backing 306. In some embodiments, the elastomeric backing 306 may be a substantially solid material, such as, for example, various rubber, synthetic polyisoprene, flouoroelastomer, silicone, butadience rubber, thermal olefin elastomer, or other similar type of material. In other embodiments, as stated, the elastomeric backing 306 may comprise a flexible outer layer that encloses a gas (such as air or nitrogen) or a liquid. In this case, for example, flexible outer layer of the elastomeric backing 306 the may comprise polyethylene, nylon/polyamide or other similar materials. In the case of the flexible outer layer is liquid filled, the liquid may comprise water, oil, or other fluids. In regard to the elastomeric backing 306 comprising a mechanical system or hydraulic configuration, embodiments in accordance with the present application may include a plurality of springs, and the springs may comprise metal, air, hydraulic or other type of spring. In this case, for example, the elastomeric backing 306 may comprise a plurality of springs that each extends from the machine ram 312 to the outer cathode surface 302. The plurality of springs may be spaced evenly over the inner-surface of the outer cathode surface 302.

It will be appreciated that, whatever the case, the elastomeric backing 306 generally may be configured such that when the outer cathode surface 302 is pressed against the uneven surface of a workpiece 106, such as the curved surface contour of a turbine blade, the uneven surface of the workpiece 106 produces an uneven pressure over the surface of the outer cathode surface 302. This uneven pressure causes the different areas of the outer cathode surface 302 to depress a distance commiserate to the level of the pressure applied. In this manner, the elastomeric backing 306 allows the outer cathode surface 302 to deform such that it approximately mimics the surface contour of the workpiece 106 to which it is engaged (i.e., pressed against).

As stated, one or more spacer pads 304 also may be included in the flexible tooling piece 300. The spacer pads 304 may comprise relatively thin pads that are spaced around the outer cathode surface 302. The spacer pads 304 may be made from a non-conducting material, such as plastic, rubber or other similar types of material. As shown and one preferred embodiment, the spacer pads 304 may be approximately evenly distributed around outer edge and inner edge of the doughnut shaped outer cathode surface 302. As shown more clearly and FIGS. 7 and 8, when the outer cathode surface 302 is engaged or pressed against a workpiece 106, the spacer pads 304 are configured such that they maintain a substantially constant and predetermined gap between the outer cathode surface 302 and the surface of the workpiece 106. It will be appreciated that the thickness of the spacer pads 304 may be provided such that a desired inter-electrode gap 112 is formed and maintained between the outer cathode surface 302 of the flexible tooling piece 300 and the surface of the workpiece 106.

Conducting strips 308 also may be included in the flexible tooling piece 300. The conducting strips 308 may include a strip of electricity-conducting material that extends from the machine ram 312 (or other component through which it might be connected to a power supply) to the outer cathode surface 302, where it might make a connection therewith. In preferred embodiments, the conducting strips 308 are flexible such that they do not impede or resist the elastic deformation of either the outer cathode surface 302 or the elastomeric backing 306 during operation. In some preferred embodiments, there is a plurality of conducting strips 308 spaced around the exterior of the elastomeric backing 306, as illustrated. Other configurations, such as a single conducting strip, a continuous conducting strip that encircles the elastomeric backing 306, or one or more conducting strips that pass through the elastomeric backing 306 or travel down the electrolyte channel 310 are also possible.

An electrolyte channel 310, as illustrated, may be located within the elastomeric backing 306 and extend from the machine ram 312 to an outlet through the outer cathode surface 302. Other configurations are also possible. The electrolyte channel 310, as shown, may have a circular cross-section, though other cross-sectional shapes are possible. Also, as shown, the electrolyte channel 310 may have a circular outlet that is flared. The electrolyte channel 310 may be made from any appropriate material, such as, for example, polyethylene, polyvinyl chloride (PVC) or other similar materials. Pursuant to conventional methods, the electrolyte channel 310 may be configured such that it is flexible and able to move independently of the surrounding elastomeric backing 306. In this manner, the electrolyte channel 310 may remain intact and undamaged when the elastomeric backing 306 and the outer cathode surface 302 are displaced during operation. It will be appreciated by those of ordinary skill in the art that many other configurations of the electrolyte channel 310 are possible. For example, the electrolyte channel 310 may comprise a plurality of channels that have a number of outlets that are evenly spaced over the outer cathode surface 302. The electrolyte channel 310 may connect to an electrolyte supply line (not shown) that connects to an electrolyte pump (not shown). In operation, as discussed in more detail below, the electrolyte pump may circulate electrolytes through the electrolyte channel 310 during operation. In this manner, an electrolyte flow may be created for the machining process and the electrolyte may be circulated through a filter such that a clean supply may be used.

In some embodiments and as shown most clearly in FIG. 5, an insulator coating 316 may be used to enhance performance of the flexible tooling piece 300. While not necessary in some ECM applications according to the present invention, the insulator coating 316 may be used in operation to prevent the electrolytic reaction from occurring at certain targeted areas of the outer cathode surface 302. These targeted areas may correspond with locations at which the flow of electrolyte is not stable, smooth or sufficient. For example, adjacent to or near the outlet of the electrolyte channel 310, the electrolyte flow generally is less stable. As a result, it may be beneficial or desired to prevent the electrolytic reaction from occurring at this location. Thus, as illustrated, a border of insulator coating 316 may be applied to the outer cathode surface 302 adjacent to and/or near the electrolyte outlet. In addition, the pressure and flow rate of the electrolyte near or adjacent to the outer edge of the outer cathode surface 302, in some instances, may be too low for effective ECM. In this case, it may be beneficial or desired to prevent the electrolytic reaction from occurring adjacent to or near the outer edge of the outer cathode surface 302. As illustrated, a border of insulator coating 316 may be applied to the outer cathode surface 302 adjacent to and/or near the outer edge or periphery of the outer cathode surface 302, which may prevent the electrolytic reaction from occurring in these areas.

Figure 6:
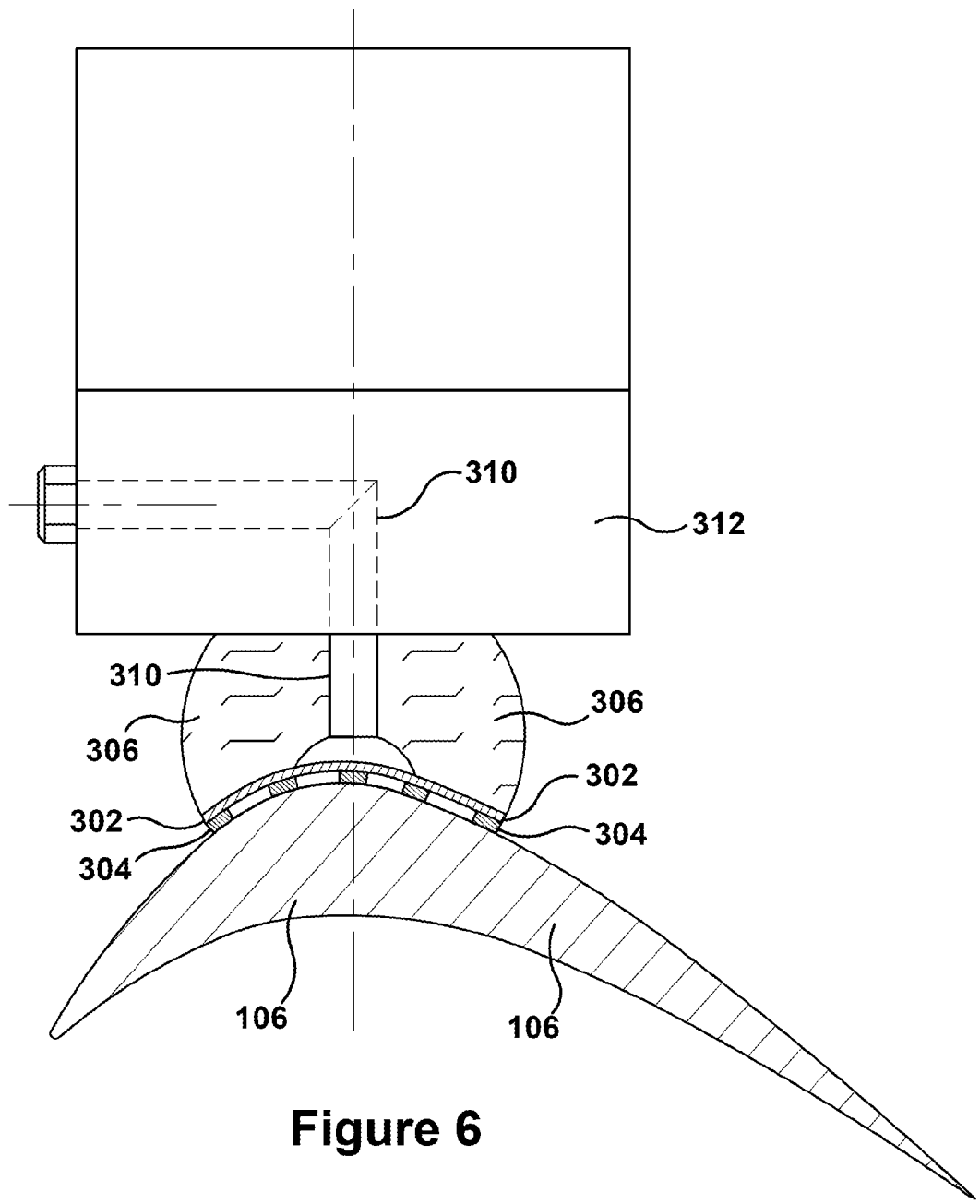
FIG. 6 illustrates a side view of a flexible tooling piece according to an exemplary embodiment as it might be positioned in use on an exemplary workpiece.
Figure 7:
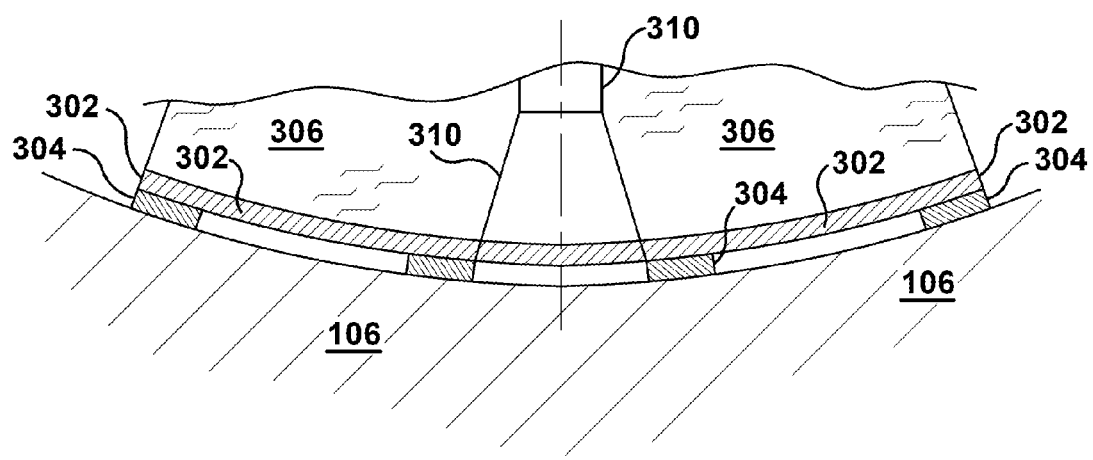
FIG. 7 illustrates a side view of a flexible tooling piece according to an exemplary embodiment as it might be positioned in use on an alternatively shaped workpiece.

In use, as depicted in FIGS. 6 and 7, the flexible tooling piece 300 may be applied via the machine ram 312 to the surface of a workpiece 106 for the purposes of electrochemical machining or polishing. FIG. 6 illustrates the application of the flexible tooling piece 300 to the suction side or convex side of an exemplary turbine blade. FIG. 7 illustrates an enlarged view of the application of the flexible tooling piece 302 to a workpiece with a concave surface contour, which, for example, may represent the pressure side of an exemplary turbine blade. Note that FIGS. 6 and 7 are provided for illustration purposes and may or may not be drawn to scale.

In both cases, the flexible tooling piece 300 elastically deforms such that the outer cathode surface 302 maintains a desired position in relation to the surface of the tooling piece for effective electrochemical machining. More specifically, the outer cathode surface 302 maintains a position that is in close proximity to the surface of the workpiece 106 but in spaced relation thereto (i.e., the outer cathode surface 302 is substantially parallel to the surface of the workpiece 106 but offset by the thickness of the space pads 302). In the case of FIG. 6, the outer cathode surface 302, suitably engaged, forms at a concave surface contour that corresponds to the convex surface contour of the workpiece 106. Whereas, in the case of FIG. 7, the outer cathode surface 302, suitably engaged, forms at a convex surface contour that corresponds to the concave surface contour of the workpiece 106.

The substantially constant distance maintained between the outer cathode surface 302 and the surface of the workpiece 106, i.e., the inter-electrode gap for the ECM application, is substantially determined by the thickness of the several spacer pads 304. This being the case, the thickness of the spacer pads 304 may be adjusted to a desired thickness depending on the ECM application. In addition, in some embodiments, the thickness of the several spacer pads 304 may be made different or variable along the surface of the outer cathode surface 302 such that the flow of electrolyte is controlled in a beneficial manner. For example, the thickness of the spacer pads 304 may be made a function of the distance the spacer pad 304 is from the center of the outer cathode surface 302/the outlet of the electrolyte channel 310. In one preferred embodiment, the thickness of the spacer pads 304 may be reduced as the distance increases from the location of the pad 304 to the center of the outer cathode surface 302/the outlet of the electrolyte channel 310. This will result in a narrowing of the gap between the outer cathode surface 302 and the surface of the workpiece 106 near the outer edge or periphery of the outer cathode surface 302. This narrowing generally will result in a higher flow rate of electrolyte through this space (as compared to the case where the spacer pads 304 are a constant thickness). As one of ordinary skill in the art will appreciate, maintaining the higher electrolyte flow rate may be advantageous in certain ECM applications. For example, the higher flow rate may better flush the hydroxide sludge and hydrogen bubbles that generally form during the electrolytic process. In some cases, these enhanced flushing characteristics may alleviate the above-described need for an insulator coating 316 at the periphery of the outer cathode surface 302.

Once the flexible tooling piece 300 is suitably engaged or positioned against the workpiece 106, an electrolyte may be pumped through the electrolyte channel 310 such that the electrolyte flows from the outlet formed through the outer cathode surface 302 and through the gap (i.e., the inter-electrode gap 112) formed between the outer cathode surface 302 and the workpiece 106. It will be appreciated that the electrolyte will generally flow from the outlet toward the periphery or outer edge of the outer cathode surface 302, where the electrolyte will generally exit the inter-electrode gap 112 that has been formed between the outer cathode surface 302 in the surface of the workpiece 106. Note that it would also be possible to operate the flexible tooling piece 300 by reversing the direction of the electrolyte pump such that the electrolyte enters the inter-electrode gap 112 at the periphery of the inter-electrode gap 112 and, from there, flows toward and then enters the electrolyte channel 310.

Using a conventional power supply (not shown), a voltage may be applied across the inter-electrode gap that is formed between the outer cathode surface 302 and the surface of the workpiece 106. As stated, in the case of the cathode, the voltage may be applied through one or more conducting strips 308 or any other conventional means. In addition, depending on the application, the voltage may be applied in any of the different ways described above in relation to the system of FIGS. 2 and 3. That is, in general, the voltage may be applied as an uninterrupted voltage with a regular amplitude, an uninterrupted voltage with a varying amplitude, a pulsed voltage with a regular amplitude, a pulsed voltage with a varying amplitude, some combination of a pulsed voltage and an uninterrupted voltage, and others. In some embodiments, a pulsed voltage may be preferable because of the advantages it offers in controlling the flushing of the electrolytic sludge that forms during the reaction. That is, by using a pulsed voltage, relatively slow electrolyte flow rates may be used while still adequately flushing the reaction products from the inter-electrode gap.

To machine the surface of a particular workpiece, it will be appreciated that in some applications the flexible tooling piece 300 may be repositioned on the surface of the workpiece a plurality of times until a desired level of machining is achieved. For example, in a particular flexible tooling piece/ workpiece engagement, the areas of the workpiece that are covered by the spacer pads 304 generally are not machined because the spacer pads block the electrolytic reaction from occurring. A slight repositioning that results in uncovering those previously covered areas may be needed to satisfy a desired level of surface uniformity. In addition, for a variety of reasons, the flexible tooling piece 300 may be sized such that it does not cover all or substantially all of the surface area of the workpiece. In this case, as one of ordinary skill in the art will appreciate, the flexible tooling piece 300 may be positioned and repositioned repetitively in a predetermined or calculated manner such that a desired level of machining/ polishing/surface uniformity is achieved on the relevant areas of the workpiece.

It will be appreciated by one of ordinary skill in the art that algorithms, control programs, logic flow diagrams, and/or software programs may be developed to control necessary hardware, components and systems such that the processes and methods of the present invention, as described above, may be practiced. As one of ordinary skill in the art will appreciate, such a system may include multiple sensors that monitor the relevant operational variables. These hardware devices and systems may send data and information to and be controlled and manipulated by a conventional operating system. That is, pursuant to conventional means and methods, an operating system may acquire data from the system, process the data, communicate with the operators of the system, and/ or control the various mechanical devices of the system pursuant to a set of instructions or logic flow diagram, which, as one of ordinary skill in the art will appreciate, may be made part of a software program and implemented via a computer-initiated operating systems.

More particularly, as one of ordinary skill in the art will appreciate, the many process steps described above in relation to the provided exemplary embodiments may be implemented and performed by a conventional computer operating system. That is, a conventional computer operating system may control the operation of conventional mechanical systems and/or, as described above, mechanical systems that have been adapted for the use in the present invention such that methods according to the present invention are preformed. In some embodiments, the operating system may comprise any appropriate high-powered solid-state switching device. The operating system may be a computer with its peripheral interfaces; however, this is merely exemplary of an appropriate high-powered control system, which is within the scope of the application. For example, but not by way of limitation, the operating system may command at least one of a high speed motion system, a fluid system, and/or a power system. The operating system also may be implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that the operating system also may be implemented using a variety of separate dedicated or programmable integrated or other electronic circuits or devices, such as hardwired electronic or logic circuits including discrete element circuits or programmable logic devices, such as PLDs, PALs, PLAs or the like. The operating system also may be implemented using a suitably programmed general-purpose computer, such as a microprocessor or microcontrol, or other processor device, such as a CPU or MPU, either alone or in conjunction with one or more peripheral data and signal processing devices. In general, any device or similar devices on which a finite state machine capable of implementing the logic flow diagram may be used as the operating system. A distributed processing architecture may be preferred for maximum data/signal processing capability and speed.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A method of electrochemical machining, the method including the steps of:
   positioning a workpiece, which comprises an anode, and a tooling piece, which comprises a cathode, in a first position;

moving at least one of the workpiece and the tooling piece toward the other such that the workpiece and the tooling piece occupy a second position;

moving at least one of the workpiece and the tooling piece away from the other such that the workpiece and the tooling piece occupy a third position; and during at least a portion of the moving of the workpiece and/or the tooling piece from the first position to the second position and from the second position to the third position, using a power supply to apply a voltage across a gap formed between the workpiece and the tooling piece;

during at least a portion of the moving of the workpiece and/or the tooling piece from the first position to the second position and from the second position to the third position, forming an inter-electrode gap between a surface of the workpiece and a surface of the tooling piece, wherein the inter-electrode gap comprises a critical dimension that corresponds to a distance across the inter-electrode gap;

as the tooling piece and/or the workpiece move from the first position to the second position, applying the voltage across the inter-electrode gap as the inter-electrode gap narrows from a first critical dimension to a second critical dimension;

when the inter-electrode gap comprises the second critical dimension, discontinuing the application of voltage across the inter-electrode gap and discontinuing the movement of the tooling piece and/or the workpiece;

after discontinuing movement of the tooling piece and/or the workpiece, holding the workpiece and the tooling piece substantially stationary for a predetermined time period; and after the predetermined time period has elapsed, moving the workpiece and/or the tooling piece to the third position;

wherein the movement from the first position to the second position is controlled such that a desired flush of an electrolyte from between the tooling piece and the workpiece is produced; and wherein the first position and the third position each comprise a separated position, the separated position comprising at least a large gap between the tooling piece and the workpiece across which electrochemical machining is not practicable.

2. The method according to claim 1, wherein the first position and the second position are configured such that the distance traveled by the tooling piece and/or the workpiece when moving from the first position and the second position comprises at least a distance between the workpiece and the tooling piece within which a desired electrolyte flush is created when the workpiece and/or the tooling piece are moved from the first position to the second position at a desired rate.

3. The method according to claim 2, wherein the desired rate at which the workpiece and/or tooling piece are moved from the first position to the second position comprises between approximately 0.2 and 3.5 meters per second.

4. The method according to claim 2, wherein the desired rate at which the workpiece and/or tooling piece are moved from the first position to the second position comprises between approximately 0.5 and 2.5 meters per second.

5. The method according to claim 1, wherein the step of moving at least one of the workpiece and the tooling piece toward the other such that the workpiece and the tooling piece occupy a second position comprises a rapid movement of the workpiece and the tooling piece toward the other.

6. The method according to claim 1, wherein the voltage is applied as a substantially uninterrupted voltage with one of a regular amplitude and a varying amplitude.

7. The method according to claim 1, wherein the voltage is applied as an uninterrupted voltage of between 12 and 20 volts.

8. The method according to claim 1, wherein the voltage is applied as an uninterrupted voltage of between 15 and 18 volts.

9. The method according to claim 1, wherein:
the voltage is applied as a pulsed voltage;
the pulsed voltage comprises a cycle that is repeated a plurality of times; and
the cycle comprises a first period of time in which a voltage is applied followed by a second period of time in which no voltage is applied.

10. The method according to claim 9, wherein the pulsed voltage comprises one of a regular amplitude and a varying amplitude.

11. The method according to claim 9, wherein:
the first period of time comprises between approximately 0.05 and 0.3 seconds;
the second period of time comprises between approximately 0.1 and 0.3 seconds;
the voltage applied during the first period of time comprises between 15 and 30 volts; and
the cycle is repeated between approximately 10 and 100 times.

12. The method according to claim 9, wherein:
the first period of time comprises between approximately 0.08 and 0.2 seconds;
the second period of time comprises between approximately 0.12 and 0.3 seconds;
the voltage applied during the first period of time comprises between 22 and 28 volts; and
the cycle is repeated between approximately 20 and 50 times.

13. The method according to claim 1, further comprising the step of submerging the tooling piece and the workpiece in an electrolyte such that the tooling piece and the workpiece are submerged in the electrolyte when the power supply applies the voltage across the gap formed between the workpiece and the tooling piece.

14. The method according to claim 1, wherein the first critical dimension comprises a value of between 0.0008 and 0.0004 meters and the second critical dimension comprises a value of between 0.0004 and 0.0001 meters.

15. A method of electrochemical machining, the method including the steps of:
positioning a workpiece, which comprises an anode, and a tooling piece, which comprises a cathode, in a first position;
moving at least one of the workpiece and the tooling piece toward the other such that the workpiece and the tooling piece occupy a second position;
moving at least one of the workpiece and the tooling piece away from the other such that the workpiece and the tooling piece occupy a third position;
during at least a portion of the moving of the workpiece and/or the tooling piece from the first position to the second position and from the second position to the third position, forming an inter-electrode gap between a surface of the workpiece and a surface of the tooling piece, wherein the inter-electrode gap comprises a critical dimension that corresponds to a distance across the inter-electrode gap;

as the tooling piece and/or the workpiece move from the first position to the second position, using a power supply to apply a voltage across the inter-electrode gap as the inter-electrode gap narrows from a first critical dimension to a second critical dimension;

when the inter-electrode gap comprises the second critical dimension, discontinuing the movement of the tooling piece and/or the workpiece;

after a first predetermined time period has elapsed after the discontinuation of the movement of the tooling piece and/or the workpiece, discontinuing the application of voltage across the inter-electrode gap;

after discontinuing the application of voltage across the inter-electrode gap, holding the workpiece and the tooling piece substantially stationary for a second predetermined time period; and after the second predetermined time period has elapsed, moving the workpiece and/or the tooling piece to the third position.

16. The method according to claim 15, wherein the first critical dimension comprises a value of between 0.0005 and 0.0004 meters and the second critical dimension comprises a value of between 0.00025 and 0.00015 meters.

17. A method of electrochemical machining, the method including the steps of:

positioning a workpiece, which comprises an anode, and a tooling piece, which comprises a cathode, in a first position;

moving at least one of the workpiece and the tooling piece toward the other such that the workpiece and the tooling piece occupy a second position;

moving at least one of the workpiece and the tooling piece away from the other such that the workpiece and the tooling piece occupy a third position;

during at least a portion of the moving of the workpiece and/or the tooling piece from the first position to the second position and from the second position to the third position, forming an inter-electrode gap between a surface of the workpiece and a surface of the tooling piece, wherein the inter-electrode gap comprises a critical dimension that corresponds to a distance across the inter-electrode gap;

as the tooling piece and/or the workpiece move from the first position to the second position, applying the voltage across the inter-electrode gap as the inter-electrode gap narrows from a first critical dimension to a second critical dimension;

when the inter-electrode gap comprises the second critical dimension, discontinuing the application of voltage across the inter-electrode gap and continuing the movement of the tooling piece and/or the workpiece such that the inter-electrode gap narrows to a third critical dimension;

when the inter-electrode gap comprises the third critical dimension, discontinuing the movement of the tooling piece and/or the workpiece; and after discontinuing the movement of the tooling piece and/or the workpiece, holding the workpiece and the tooling piece substantially stationary for a predetermined time period; and moving the workpiece and/or the tooling piece to the third position.

18. The method according to claim 17, wherein the first critical dimension comprises a value of between 0.0008 and 0.0004 meters, the second critical dimension comprises a value of between 0.0004 and 0.0001 meters, and the third critical dimension comprises a value between 0.0004 and 0.0008 meters.

* * * * *